(12) United States Patent
Song et al.

(10) Patent No.: US 10,526,795 B2
(45) Date of Patent: Jan. 7, 2020

(54) OUTDOOR BAMBOO FLOOR

(71) Applicant: Zhejiang Yongyu Bamboo Joint-Stock Co., Ltd., Huzhou (CN)

(72) Inventors: Jiangang Song, Huzhou (CN); Fuqing Liu, Huzhou (CN); Gang Cheng, Huzhou (CN); Yongxing Chen, Huzhou (CN)

(73) Assignee: Zhejiang Yongyu Bamboo Joint-Stock Co., Ltd., Huzhou (CN)

( * ) Notice: Subject to any disclaimer, the term of this patent is extended or adjusted under 35 U.S.C. 154(b) by 212 days.

(21) Appl. No.: 15/068,702

(22) Filed: Mar. 14, 2016

(65) Prior Publication Data

US 2017/0081861 A1    Mar. 23, 2017

(30) Foreign Application Priority Data

Sep. 17, 2015    (CN) .......................... 2015 1 0592085

(51) Int. Cl.
| | |
|---|---|
| *E04F 15/02* | (2006.01) |
| *E04F 15/04* | (2006.01) |
| *E04F 15/10* | (2006.01) |
| *B32B 21/04* | (2006.01) |
| *B05D 1/18* | (2006.01) |
| *B27K 3/00* | (2006.01) |

(52) U.S. Cl.
CPC .......... *E04F 15/02183* (2013.01); *B05D 1/18* (2013.01); *B27K 3/00* (2013.01); *E04F 15/04* (2013.01); *E04F 15/042* (2013.01); *E04F 15/045* (2013.01); *E04F 15/102* (2013.01)

(58) Field of Classification Search
CPC ..... Y10T 428/24066; Y10T 428/24074; Y10T 428/24124; Y10T 428/31971; Y10T 428/31975; Y10T 428/31982; E04F 15/02183; E04F 15/04; E04F 15/042; E04F 15/045; E04F 15/102; B32B 21/04; B32B 2260/026; B32B 2262/067
See application file for complete search history.

(56) References Cited

U.S. PATENT DOCUMENTS

| | | | | |
|---|---|---|---|---|
| 6,376,582 | B1* | 4/2002 | Iwata ..................... | B27N 1/003 264/112 |
| 6,916,507 | B2* | 7/2005 | Matsumura ............ | C08G 77/26 106/287.11 |
| 7,037,960 | B2* | 5/2006 | Ukai ..................... | B27N 1/0263 264/122 |
| 8,202,389 | B2* | 6/2012 | Handojo .................. | B27D 1/06 156/250 |
| 8,709,578 | B2* | 4/2014 | Zhang ..................... | B27N 3/04 144/333 |

(Continued)

*Primary Examiner* — Joanna Pleszczynska
(74) *Attorney, Agent, or Firm* — NK Patent Law

(57) ABSTRACT

The present invention relates to an outdoor bamboo floor and a manufacturing method thereof, in particular, to an outdoor bamboo floor subjected to an immersion treatment using hot oil. Conduits or other capillary structures of a bamboo material in the outdoor bamboo floor of the present invention are filled with an oil medium, with an oil content of 2-10%. The manufacturing method includes immersing a plate blank of the bamboo floor in a hydrophobic organic medium at 100-300° C. for 1-10h, and are statically cooled down to a room temperature after being taken out.

7 Claims, 2 Drawing Sheets

(56) References Cited

U.S. PATENT DOCUMENTS

| | | | | |
|---|---|---|---|---|
| 2009/0260313 | A1* | 10/2009 | Segaert | E04F 15/02 |
| | | | | 52/592.1 |
| 2012/0199249 | A1* | 8/2012 | Almen | C09D 9/005 |
| | | | | 144/332 |
| 2012/0231256 | A1* | 9/2012 | Huang | B32B 21/02 |
| | | | | 428/220 |
| 2012/0264853 | A1* | 10/2012 | Ziegler | B29C 41/28 |
| | | | | 524/13 |
| 2014/0154515 | A1* | 6/2014 | Brynildsen | B27K 1/00 |
| | | | | 428/414 |
| 2014/0202647 | A1* | 7/2014 | Hagiopol | D21H 21/16 |
| | | | | 162/164.6 |
| 2015/0013877 | A1* | 1/2015 | Earnshaw | C08L 97/005 |
| | | | | 156/62.2 |

* cited by examiner

OUTDOOR BAMBOO FLOOR

CROSS-REFERENCE TO RELATED APPLICATIONS

This application claims priority to Chinese Patent Application No. 201510592085.1 filed on Sep. 17, 2015, the entire contents of which are incorporated by reference herein.

BACKGROUND OF THE INVENTION

Field of Invention

The present invention relates to an outdoor bamboo floor and a manufacturing method thereof, in particular, to an outdoor bamboo floor subjected to an immersion treatment using hot oil.

Description of Related Art

China is rich in bamboo, the yield of bamboo is large, and China also has a long history of bamboo and plentiful articles of using bamboo wood. Bamboo wood has advantages of good tenacity, and great intensity, and is manufactured as a raw material for indoor floors, outdoor floors, and furniture on the market. However, bamboo wood contains a large amount of sugar, protein, and the contents are plentiful. Therefore, it is easy to be infringed and corroded by bamboo rot fungi; the existence of lignin, hemicelluloses, and cellulose renders the dimensional stability of the recombined bamboo material weak; moreover, in the recombination procedure, a large amount of adhesive is required, thereby causing the problem of releasing a large amount of methanol; and the abovementioned problems put forward a severe test for the outdoor application of the recombined bamboo.

In order to solve the abovementioned technical problems, the existing technical solution CN202672610U (2013-1-16) discloses a bamboo floor structure with an erosion resistant layer attached on a surface, wherein the surface of the erosion resistant layer is provided with a 3D texture integrally formed by grooves. The waterproof and antirot material of the technical solution has a strong adhesive force, without repeatedly coating the waterproof layer. However, the technical solution only solves the problem of mildew and rot in the surface of the bamboo wood. The mildew and rot problem inside the bamboo wood (the recombined bamboo) cannot be solved. Moreover, the technical solution is relatively single, and could not solve all problems.

BRIEF SUMMARY OF THE INVENTION

The purpose of the present invention is to provide an outdoor bamboo floor, with consistent and even internal and external treatments on the floor, good mechanical properties, dimensional stability, and rot and mildew resistance capabilities.

A second purpose of the present invention is to provide a producing process for producing the abovementioned outdoor bamboo floor, wherein the process procedure is simple, has high working efficiency, a fewer equipment investments, and an even treating effect.

A first technical purpose of the present invention is achieved through the following technical solution: an outdoor bamboo floor, wherein conduits or other capillary structures of the bamboo floor are filled with an oil medium, with an oil content of 2-10%.

Regarding the existing product, after the high-heat treatment, internal conduits or other capillary structures are in a hollow or semi-hollow state, which causes great loss to the mechanical properties of the product, and affects the usage of the product in a load-bearing position; the immersion treatment on the surface layer only aims at the surface of the product, while the internal portion still has the risk of suffering from mildew and rot. The beneficial effect of the present invention is to fill the oil medium into the conduits and other capillary structures of the product, to strengthen the structure and reinforce the mechanical properties of the product, so that the product is particularly adaptive to paving the ground of the outdoor environment.

Preferably, the oil medium is evenly distributed on each section of the bamboo floor.

In the technical solution of the present invention, the oil medium is evenly and sufficiently filled, and replaced the substance inside the conduits and other capillary structures of the recombined bamboo, so that the mildew and rot preventing effects, the dimensional stabilities, and the mechanical properties on the surface layer and inside the product are even and uniform, so as to avoid quality problems such as mildew and rot appeared inside during usage, the deformation generated by different stabilities of the surface and internal layers, and damages caused by internal stresses.

Preferably, a moisture content of the outdoor bamboo floor is 1-5%, a mildew and discoloration preventing performance (mildew) harmed value is 0, a thickness swelling rate of water absorption is 2-10%, a width swelling rate of water absorption is 1-4.5%, and a horizontal shear strength is greater than or equal to 12 MPa. Preferably, the moisture content of the outdoor bamboo floor is 1-3%, the thickness swelling rate of water absorption is 2-4.5%, and the width swelling rate of water absorption is 1-3%. Various physicochemical properties of the product are all better than international restriction requirements; and during usage, the produce would not be rotten by the mildew, deformed, or cracked, and the adhesive layers would not be unglued.

Preferably, the oil medium filled in the conduits or other capillary structures of the outdoor bamboo floor is one or more of mineral substance oil, vegetable oil, alkylbenzene typed conduction oil, alkyl biphenyl typed conduction oil, alkyl biphenyl ether typed conduction oil, biphenyl and biphenyl ether eutectic mixture typed conduction oil or alkyl naphthalene typed conduction oil. The abovementioned oil medium has good thermo stabilization, and only reacts with the bamboo wood through a physical immersion and a chemical reaction similar to acetylation. It is slightly decomposed under the action of the high temperature, volatile matters do not contain harmful toxic matters, and the producing and processing procedure is safe and environmental-friendly.

Preferably, the thickness of the outdoor bamboo floor is 0-40 mm.

Preferably, the thickness of the outdoor bamboo floor is 15-24 mm. In the technical solution of the present invention, the thickness of the outdoor bamboo floor has a wide range which can almost cover requirements on the thickness of the floor in various usage occasions.

Preferably, a rabbet structure is provided on two sides of the outdoor bamboo floor along the direction of the length.

Preferably, it further includes a finish layer, which includes one of a UV ultraviolet light curing paint layer, hard wax oil or varnish, and the thickness of the coating is 0.05-0.2 mm.

The UV ultraviolet light curing paint is automatically coated by a machine device, the curing film formation speed is fast, the rigidity of the paint film is high, the abrasive resistance is good, the transparency is good, the quality is stable, and the hard wax oil and the varnish have advantages of being environmental friendly and having a natural coating effect.

A second technical purpose of the present invention is achieved through the following technical solution:

A method for manufacturing an outdoor bamboo floor, including immersing a plate blank of the bamboo floor in a hydrophobic organic medium at 100-300° C. for 1-10 h, and statically cooling down to a room temperature after being taken out.

The bamboo floor can be a recombined bamboo floor or an ordinary bamboo floor; when the bamboo floor is a recombined bamboo floor, the recombined bamboo floor is formed by laminating bamboo filaments or bamboo chips with an adhesive. Problems such as mildew and worm damages would easily appear in the bamboo filaments in the bamboo floor, in particular, the recombined bamboo floor, while the recombined bamboo floor per se is liable to be deformed and cracked. This is mainly because cellulose and hemicellulose are polysaccharides containing a large amount of hydroxide radicals, and are liable to absorb water and be decomposed and used by microorganisms. Using the charring method for the bamboo filament treatment is mainly to oxidate the hydroxide radicals contained in the cellulose and hemicellulose, so as to greatly reduce the water-absorbing property thereof while preventing the same from being decomposed and used by the microorganism any more. However, using the charring approach for the bamboo filament treatment takes a long period of time, has a high cost, the charring is uneven, the compression resistance property is weak, and a color difference exists on the surface. Air is the medium for transferring thermal during this procedure. After charring, the bamboo filaments also required to be subjected to sizing and hot-pressing so as to prepare the recombined bamboo floor. The inventor considers that as compared with air, the effect would be better when using a liquid medium as the transfer medium, because the liquid medium can enable each part of the recombined bamboo floor to be evenly heated; heated liquid can enter the interior of the bamboo wood through the vascular bundle of the bamboo wood, so as to accelerate the hydroxide radicals of the cellulose and the hemicellulose to react similar to acetylation. Therefore, treating the recombined bamboo floor through the hydrophobic organic medium can both degrading the hydroxide radicals contained in the cellulose and hemicellulose, and degrading organic substances such as sugar and protein inside the bamboo wood at the same time, so that the problems such as mold, worm damage, deformation, and cracks no longer exist, production efficiency can also be increased, production cost reduced, the compression resistance property of the product is good, and on color difference appears on the surface. In the present invention, the moisture content of the bamboo wood can reach 30%, a higher moisture content of the bamboo wood simplifies the requirements on the drying procedure of the bamboo wood, and shortens the drying cycle. Meanwhile, a higher amount of moisture can form during the oil immersion step, which has a relatively large steam pressure gradient, thus benefiting the immersion of the hydrophobic organic medium.

A method for manufacturing the outdoor bamboo floor, wherein the outdoor bamboo floor is prepared by the following steps:

(1) a sizing step: mixing bamboo filaments and a thermosetting or thermosetting modified resin adhesive to obtain sized bamboo filaments;

(2) a drying step: drying the sized bamboo filaments to a moisture content of 2-30%;

(3) a cold pressing and thermosetting step: cold pressing and thermosetting the dried bamboo filaments so as to be molded;

(4) an oil immersion treatment step: heating an oil medium to 100-300° C., then placing a molded material after being cold pressed and molded into the thermal oil medium, and treating for 1-10 h;

(5) an automatic oil absorption step;

(6) a rabbeting procedure: processing two sides of the bamboo floor along the direction of the length to obtain a rabbet structure; and (7) a coating procedure: performing surface coating with a coating material on a surface of the molded material.

Further preferably, in the sizing step, one or more of a phenolic resin, an urea resin, or a melamine methanol resin are used, the adhesive solid content is 30-45%, and the sizing amount is 10-25% of the amount of the bamboo filaments.

Further preferably, in the drying step, the molded material is dried to the condition that the moisture content thereof is 2-20%.

Further preferably, the cold pressing step is followed by the curing step. In the curing step, the molded material prepared in the cold pressing step is sent into a tunnel (one of the devices constituting a continuous hot press machine) for thermal curing; and then the molded material after the thermal curing is taken out from a mold, wherein the thermal curing temperature in the curing step is 120-150° C. In the curing step, the adhesive is not completely cured, and after performing the oil immersion step on the semi-cured (i.e., not completely cured) molded material, complete curing (i.e., the part that is not cured is now curing) of the adhesive is achieved and the gluing property is increased.

Further preferably, in the oil immersion step, after being cold pressed and molded, the molded material is vertically immersed; the vertical immersion specifically relates to immersion with the direction of the oil tempering steam parallel to the direction of the vascular bundle of the molded material after being cold pressed and molded.

Adopting the method of the present invention can avoid the quality problems of the material for the bamboo wood such as exploded cracks, to increase the security of the treating procedure and the evenness of the color of the bamboo wood by oil immersion.

The vascular bundle of the present invention refers to the conduits and thick walled fiber of the bamboo wood. After long-term researches, the inventor finds out that when the bamboo wood is subjected to the oil immersion treatment, the immersion direction is very important, which affects not only the security in treating but also the evenness of the treatment on the bamboo wood. If the lateral immersion is adopted, when the oil tempering steam is transmitted upwards, which is vertical to the vascular bundle of the bamboo wood, the oil tempering steam and the water vapor in the vascular bundle of the bamboo wood are difficult to be discharged, thus, it can easily burst.

Further preferably, the oil immersion step is divided into the following stages:

(1) an adhesive curing stage;

(2) a thermal treating stage, to lower the moisture content of a bamboo wood to 0-3%; (3) an immersion treating stage, wherein an immersion reagent is the used oil medium, and an immersion depth is 10-20 mm; and the immersion depth refers to the depth of the oil medium immersed and permeated in the conduits and other capillary structures of the recombined bamboo molded material, and a numeral value indicates the depth from the surface towards the center in the direction of the thickness.

The abovementioned three stages are completed in the oil immersion step at one time.

In the present invention, the recombined bamboo molded material first has a high moisture content; a large amount of water exists in the conduits and other capillaries; and water vapor is formed using high temperatures, and is discharged through two ends of the recombined bamboo molded material. Meanwhile, in the high temperature environment, a high-heat treatment is performed on the recombined bamboo molded material; and after the treatment, nutrient substances such as sugar and protein inside the recombined bamboo molded material are decomposed. Therefore, an internal pressure gradient which is high externally and low internally is formed inside the recombined bamboo molded material; under the drive of the pressure gradient, the oil medium enters inside the recombined bamboo molded material. After the high-heat treatment, the immersion under normal pressure and at the high temperature is automatically achieved. At high temperatures, hemicellulose easily decomposes, and the proportion of the cellulose that is hard to be decomposed increases; a reaction similar to acetylation happens with the cellulose to form an ester group; the ester group has a capacity-increase function; moreover, due to the decreasing of the hydroxide radicals and the expansion function of the ester group, the mildew preventing and waterproof properties of the bamboo wood are further improved, so that the dimensional stability of the recombined bamboo molded material is increased, wherein the function of the latter is more remarkable. In the high-heat treatment, the thermosetting numeral value adhesive is again performed with a polymerization reaction, the nutrient substances such as sugar and protein and water are vaporized, to increase the gluing strength and mildew preventing property of the recombined bamboo molded material, and reduce the water-absorbing property of the bamboo wood; and the abovementioned effects are solidified through immersion and acetylation treatments, and the mechanical properties of the recombined bamboo molded material are strengthened.

The abovementioned effects are all accomplished in the one step of oil bath immersion treating, the same device and the same treating medium do not require to be repeatedly uploaded and unloaded, and the temperature of the medium is not required to be raised or cooled; and the raising of the temperature is accomplished in the oil bath immersion treating step at one time, and the raising of the temperature and the maintaining of the temperature are performed regardless of the stages, which simplifies process steps of modifying the recombined bamboo wood, increases the producing efficiency, greatly reduces input of the device and labor force, lowers the producing cost, and improves the product quality.

Further preferably, in the automatic oil absorption step is the step of directly taking out the molded material from the oil medium and statically placing at a normal temperature for 2-10 min, so that surface attached oil is automatically absorbed into the conduits or other capillary structures of the molded material.

The undischarged steam and inflated air inside the molded material that is taken out is cooled and shrunk, thus the external pressure of the molded material is greater than the internal pressure, to form a negative pressure to press the attached oil on the surface of the molded material into the plate blank, which creates the effect of automatic absorption. Through the automatic oil absorption step, packaging the molded material is achieved, thereby achieving the effect of reducing, even eliminating, methanal release, and increasing the environmental protection property of the product.

The cooling step is to stack the treated bamboo wood in an environment with the temperature of 0-30° C., and a relative humidity of 50-70% for natural cooling.

In conclusion, the present invention has the following beneficial effects:

1. The product properties are superior to those of the existing product.

In the technical solution of the present invention, three effective modifying treatments are performed on the bamboo wood, so that the mildew preventing property and dimensional stability of the molded material and the material color of the molded material are improved, and the density of the bamboo wood, and the mechanical properties and the gluing strength of the adhesive layer are increased. The product properties of the present technical solution are better as compared with the loss of the density and the mechanical property of the recombined bamboo molded material treated by the prior art.

2. The treating effect is even.

The protective medium and thermal conduction for the thermal treatment is the thermal oil at the high temperature, the oil is a good thermal conductor, and is evenly heated. Therefore, thermal treating effect is even. The initial moisture content of the treated bamboo wood is relatively high, a relatively greater steam pressure is formed during the thermal treatment, and the immersion treatment is sufficient. Therefore, the oil medium filling effect is even. Physical and chemical properties such as density, mechanical properties, and oil content of the product in each directional profile are even and uniform.

3. The material color is more plentiful, and natural.

The material color after the molded material treatment differs corresponding to different temperatures and times of the oil immersion treatment; as compared with the existing product which only has the color of a carbonized color and a dark carbonized color, the product material color provided by the technical solution of the present invention is more plentiful; the protective medium and the thermal conduction for the thermal treatment is the thermal oil at a high temperature, which is more evenly heated and has more natural material color after the treatment compared to the vacuum thermal treatment and the thermal treatment using water vapor for protection.

4. The working efficiency is high.

Unlike the conventional thermal treatment on the bamboo wood, or the immersion and thermal treatment with divided procedures, the technical solution of the present invention performs the thermal treatment, the immersion treatment and the chemical reaction similar to acetylation on the bamboo wood, moreover, the three treating effects are accomplished in one procedure, avoiding repeatedly upload and unload of the bamboo wood, preventing the temperature of the device and reagent from being repeatedly raised and lowered, so that the working efficiency is high.

5. The device input and cost are low.

The technical solution of the present invention only relates to cold pressing device and thermal immersion device, moreover, the oil immersion treatment process steps are simple, and the requirements on the oil immersion device is low; and the producing cost is only the loss of the thermal oil at the high temperature, and the bamboo wood supplies.

6. The processing procedure and product are environmental friendly.

In the producing procedure, oil is recycled, in addition to the volatilization of the own nutrient substances of the wood per se, the water, and the degraded substances from the hemicellulose, no any other discharge; and the adopted oil medium is non-toxic and harmless; therefore, the environmental protection properties in producing procedure are excellent, and the environmental protection level of the product is excellent.

Figure 1:
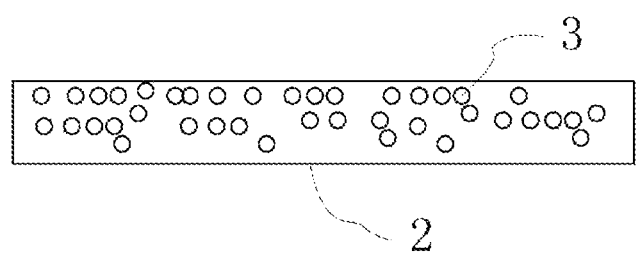
FIG. 1 is a structural diagram of embodiment 1 of the present invention.

In the drawings, 1—a finish layer; 2—a recombined bamboo molded material; and 3—conduits and other capillary structures.

DETAILED DESCRIPTION OF THE INVENTION

The present utility model is further explained in detail in combination of the drawings.

The embodiments merely explain the present utility model, rather than restricting the present invention. After finishing reading the specifications, persons skilled in the art can make amendments, which do not contribute to the inventiveness or the embodiments according to requirements. However, any amendment within the scope of the claims of the present invention is protected under the Patent Law.

Embodiment 1: preparation of the outdoor bamboo floor: the bamboo filaments and thermosetting phenolic resin adhesion agent are first mixed by means of glue mixing, the solid content of the adhesive is 30%, and the sizing amount is 10% of the amount of the bamboo filaments; the mixed bamboo filaments is then dried to a moisture content of 2-5%, and becomes a molded material with the thickness of 22 mm after being subjected to cold pressing and thermosetting; the vegetable oil is injected into a container and heated to 300° C., and the temperature is kept; the vascular bundle of the molded material is enabled to be parallel to the direction of the oil tempering steam, in this way, the immersion is performed, and the molded material is immersed under the surface of the oil liquid, and kept for 1 h; after being taken out, the molded material is statically placed for 10 min, and after the surface attached oil is automatically absorbed into the molded material, the molded material is placed in an environment with the temperature of 30° C., and the relative humidity of 70% for natural cooling. The outdoor bamboo floor shown in FIG. 1 is obtained, the conduits or other capillary structures 3 are filled with the oil medium, the oil content is 2%, the moisture content is 1%, the mildew and discoloration preventing performance (mildew) harm value is 0, the thickness swelling rate of water absorption is 3.5%, the width swelling rate of water absorption is 3.5%, and the horizontal shear strength is 13.5 MPa. A rabbet structure is manufactured at two sides of the recombined bamboo molded material 2 through a four side moulder, and a layer of hard wax oil with the thickness of 0.1 mm is coated on the surface using a coating machine.

Figure 2:
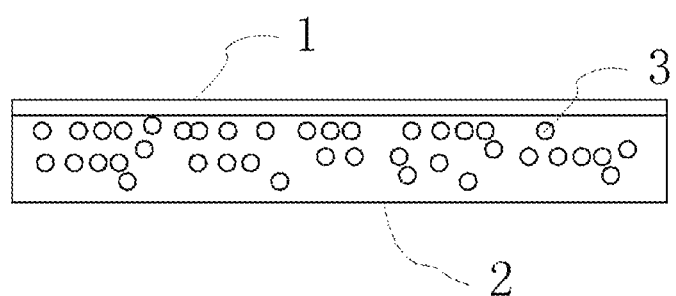
FIG. 2 is a structural diagram of embodiments 2 and 3 of the present invention.

Embodiment 2: an outdoor bamboo floor: the bamboo filaments and thermosetting urea resin adhesion agent are first mixed by means of glue dipping, the solid content of the adhesive is 45%, and the sizing amount is 25% of the amount of the bamboo filaments; the mixed bamboo filaments is then dried to a moisture content of 25-30%, and becomes a molded material with the thickness of 40 mm after being subjected to cold pressing and thermosetting; the vegetable oil is injected into the container and heated to 100° C., and the temperature is maintained. the vascular bundle of the molded material is parallel to the direction of the oil tempering steam, in this way, the immersion is performed, and the molded material is immersed under the surface of the oil liquid, and kept for 10 h; after being taken out, the molded material is statically placed for 2 min, and after the surface attached oil is automatically absorbed into the molded material, the molded material is placed in an environment with the temperature of 30° C., and the relative humidity of 50% for natural cooling. The outdoor bamboo floor shown in FIG. 2 is obtained, the conduits or other capillary structures 3 are filled with the oil medium, the oil content is 6%, the moisture content is 2.1%, the mildew and discoloration preventing performance (mildew) harmed value is 0, the thickness swelling rate of water absorption is 2.8%, the width swelling rate of water absorption is 3.3%, and the horizontal shear strength is 12.9 MPa. A rabbet structure is manufactured at two sides of the recombined bamboo molded material 2 through the four side moulder.

Embodiment 3: an outdoor bamboo floor: the bamboo filaments and thermosetting urea resin adhesion agent are first mixed by means of glue dipping, the solid content of the adhesive is 35%, and the sizing amount is 20% of the amount of the bamboo filaments; the mixed bamboo filaments is then dried to a moisture content of 12-17%, and becomes a molded material with the thickness of 30 mm after being subjected to cold pressing and thermosetting; the vegetable oil is injected into the container and heated to 180° C., and the temperature is kept; the vascular bundle of the molded material is parallel to the direction of the oil tempering steam, in this way, the immersion is performed, and the molded material is immersed under the surface of the oil liquid, and kept for 5 h; after being taken out, the molded material is statically placed for 6 min, and after the surface attached oil is automatically absorbed into the molded material, the molded material is placed in an environment with the temperature of 20° C., and the relative humidity of 60% for natural cooling. The outdoor bamboo floor shown in FIG. 2 is obtained, the conduits or other capillary structures 3 are filled with the oil medium, the oil content is 5%, the moisture content is 2.3%, the mildew and discoloration preventing performance (mildew) harmed value is 0, the thickness swelling rate of water absorption is 2.7%, the width swelling rate of water absorption is 3.2%, and the horizontal shear strength is 14 MPa. A rabbet structure is manufactured at two sides of the recombined bamboo molded material 2 through the four side moulder, and the hard wax oil finish layer 3 is coated.

Embodiment 4: an outdoor bamboo floor: the bamboo filaments and thermosetting urea resin adhesion agent are first mixed by means of glue dipping, the solid content of the adhesive is 32%, and the sizing amount is 20% of the amount of the bamboo filaments; the mixed bamboo filaments is then dried to a moisture content of 10-13%, and becomes a molded material with a thickness of 30 mm after being subjected to cold pressing and thermosetting; then the molded material is transmitted to a tunnel of a continuous press machine, and the tunnel temperature (i.e., the thermal curing temperature) is controlled as 130° C.; the vegetable oil is injected into the container and heated to 180° C., and the temperature is kept; the vascular bundle of the molded material is parallel to the direction of the oil tempering steam, in this way, the immersion is performed, and the molded material is immersed under the surface of the oil liquid, and kept for 5 h; after being taken out, the molded material is statically placed for 6 min, and after the surface attached oil is automatically absorbed into the molded material, the molded material is placed in an environment with the temperature of 20° C., and the relative humidity of 60% for natural cooling. The conduits or other capillary structures of the obtained outdoor bamboo floor are filled with the oil medium, the oil content is 10%, the moisture content is 5%, the mildew and discoloration preventing performance (mildew) harmed value is 0, the thickness swelling rate of water absorption is 2.5%, the width swelling rate of water absorption is 3.1%, and the horizontal shear strength is 13.6 MPa. A rabbet structure is manufactured at two sides of the recombined bamboo molded material through the four side moulder, and the hard wax oil finish layer is coated.

Embodiment 5: 1. Manufacturing the plate using the bamboo wood: the bamboo filaments or bamboo chips are paved as a square material; the abovementioned square material is placed into the tunnel for thermal curing; and the square material is taken out from the mold after the thermal curing. (4) The square material taken out from the mold is processed and manufactured as the plate blank.

2. Oil tempering: the plate blank is slowly placed in the alkylbenzene typed conduction oil at 100° C. and immersed for 1 h, wherein the direction of the vascular bundle of the bamboo wood is vertical to the surface of the hydrophobic medium during placing. When the conduction oil temperature is 50° C., the recombined bamboo floor is taken out, and naturally cooled to the room temperature.

3. Surface treatment: an outer surface of the recombined bamboo floor is coated with a layer of alkylbenzene typed conduction oil after the oil tempering.

Comparative embodiment 1: the bamboo filaments and thermosetting phenol adhesion agent are first mixed by means of glue dipping, the solid content of the adhesive is 35%, and the sizing amount is 20% of the amount of the bamboo filaments; the mixed bamboo filaments is then dried to a moisture content of 12-17%, and becomes a molded material with the thickness of 30 mm after being subjected to cold pressing and thermosetting; the vegetable oil is injected into a container and heated to 70° C., and the temperature is kept; the vascular bundle of the molded material is parallel to the direction of the oil tempering steam, in this way, the immersion is performed, and the molded material is immersed under the surface of the oil liquid, and kept for 10 h; after being taken out, the molded material is statically placed for 10 min, the surface attached oil is not automatically absorbed into the molded material, and is wiped away manually, and then the molded material is placed in an environment with the temperature of 20° C., and the relative humidity of 60% for natural cooling. The conduits or other capillary structures of the obtained outdoor bamboo floor are filled with the oil medium, the oil content is 0, the moisture content is 15.6%, the mildew and discoloration preventing performance (mildew) harmed value is 2, the thickness swelling rate of water absorption is 11.2%, the width swelling rate of water absorption is 5.4%, and the horizontal shear strength is 10.2 MPa.

Comparative embodiment 2: the bamboo filaments and thermosetting phenol adhesion agent are first mixed by means of glue dipping, the solid content of the adhesive is 35%, and the sizing amount is 20% of the amount of the bamboo filaments; the mixed bamboo filaments is then dried to a moisture content of 12-17%, and becomes a molded material with the thickness of 30 mm after being subjected to cold pressing and thermosetting; the vegetable oil is injected into a container and heated to 200° C., and the temperature is kept; the vascular bundle of the molded material is vertical to the direction of the oil tempering steam, in this way, the immersion is performed, and the molded material is immersed under the surface of the oil liquid, and kept for 5 h; and quality problems such as obvious cracks and burst cracks appear in the treated molded material, rendering it unusable.

Comparative Embodiment 3

According to the existing bamboo wood thermal treating technique, the thermal treatment is performed on the bamboo filaments at 220° C. for 6 h; the bamboo filaments are applied with the thermosetting phenolic resin adhesive by means of glue dipping, dried to the moisture content of 13-15%; the hot-pressing curing treatment is further performed, wherein the hot-pressing temperature is 140° C., and the pressure maintaining time is 45 min; and the recombined bamboo wood is finally obtained through cooling and preserving.

Comparative Embodiment 4

The bamboo filaments are placed in a charring furnace, the alkylbenzene typed conduction oil at 220° C. is transmitted into a cooling fin in the charring furnace via a conduction oil tube and maintained for 16 h, and after being taken out, the bamboo filaments is applied with the thermosetting phenolic resin adhesive by means of glue dipping and dried to the moisture content of 8-15%; then the hot-pressing curing treatment is performed, wherein the hot-pressing temperature is 145° C., pressure maintaining time is 45 min; and the recombined bamboo wood is finally obtained through cooling and preserving.

Table 1 is a comparative table of product properties in various embodiments.

TABLE 1

Comparative table of physical and chemical properties obtained through detecting bamboo wood oil tempering immersion molded material product

| Item | Product property parameters | | | | | | |
|---|---|---|---|---|---|---|---|
| | Emb. 1 | Emb. 2 | Emb. 3 | Emb. 4 | Comp. Emb. 1 | Comp. Emb. 2 | Comp. Emb. 3 |
| Moisture content (%) | 2.6 | 2.1 | 2.3 | 2.3 | 15.6 | / | 11.5 |
| Thickness swelling rate of water absorption (%) | 3.5 | 2.8 | 2.7 | 2.5 | 11.2 | / | 8.4 |
| Width swelling rate of water absorption (%) | 3.5 | 3.3 | 3.2 | 3.1 | 5.4 | / | 3.5 |
| Mildew preventing harmed value | 0 | 0 | 0 | 0 | 2 | / | 1 |
| Methanol release capacity (mg/L) | 0.15 | 0.2 | 0.25 | 0.16 | 1.3 | / | 1.2 |
| Oil length (%) | 5 | 6 | 5 | 6 | 0 | / | / |
| Horizontal | 13.5 | 12.9 | 14.0 | 13.6 | 10.2 | / | 12.5 |

TABLE 1-continued

Comparative table of physical and chemical properties obtained through detecting bamboo wood oil tempering immersion molded material product

| Item | Emb. 1 | Emb. 2 | Emb. 3 | Emb. 4 | Comp. Emb. 1 | Comp. Emb. 2 | Comp. Emb. 3 |
|---|---|---|---|---|---|---|---|
| shear strength (MPa) | | | | | | | |

It can be known from Table 1 that product properties in the 4 Embodiments are all far superior to Comparative Embodiments 1 and 3 and national standards. As compared with Comparative Embodiment 1, it can be known that the technical solution of the present invention is the optimal technical solution, and products with good properties can only be obtained according to the process parameters in the technical solution. As compared with Comparative Embodiment 2, the best effect is achieved at the loading direction of the recombined bamboo molded material when the vascular bundle thereof is parallel to the oil tempering steam, and the loading method can enable the treating effect to be even and the treating procedure to be safe. As compared with Comparative Embodiment 3, i.e., the existing process, the various physical and chemical properties of the product are all superior to those of the existing process, and the gluing strength of the product is further increased.

As shown in Table 2, the process producing cost in the present invention is far below that of the conventional charring process, in particular, the costs in the recombined bamboo plate blank and the electric charge are greatly reduced. On the contrary, in comparative embodiment 2, the recombined bamboo floor cannot be used due to cracking caused by the treating procedure thereof. The recombined bamboo floor after the oil tempering in the present invention has the producing cost far below various conventional processes; also the recombined bamboo floor produced thereby has various property indexes far better than those of the various conventional processes, and has a relatively wider application prospect.

TABLE 2 producing and processing cost comparative table of oil tempering technique of recombined bamboo floor

| | Costs (yuan/m²) | | | |
|---|---|---|---|---|
| Item | Embodiment 1 | Embodiment 2 | Embodiment 3 | Comparative embodiment 4 |
| Recombined bamboo plate blank | 87 | 87 | 87 | 128 |
| Conduction oil loss | 9 | 8 | 8 | 5 |
| Oil carbon | 1 | 1 | 1 | 1 |
| Electric charge | 3 | 3 | 3 | 17 |
| Frame-saw procedure fee | 2 | 2 | 2 | 2 |
| Drying procedure fee | 4 | 4 | 4 | 7 |
| Total | 104 | 103 | 103 | 160 |

What is claimed:

1. An outdoor bamboo floor, wherein conduits or other capillary structures of a bamboo material in the bamboo floor are filled with an oil medium, with an oil content of 2-10%,
    wherein the oil medium filled in the conduits or other capillary structures of the bamboo floor is one or more of an alkylbenzene typed conduction oil, mineral substance oil, alkyl biphenyl typed conduction oil, alkyl biphenyl ether typed conduction oil, biphenyl, and biphenyl ether eutectic mixture typed conduction oil or alkyl naphthalene typed conduction oil,
    wherein the bamboo floor has a thickness swelling rate of water absorption greater than 2.5% and less than 3.1%, or greater than 7.5% and less than or equal to 10%,
    wherein the bamboo floor is a recombined bamboo floor, the recombined bamboo floor is formed by laminating bamboo filaments or bamboo chips with an adhesive,
    wherein the conduits or other capillary structures are filled by an oil immersion treatment step, wherein in the oil immersion treatment step, after the bamboo material is cold pressed and molded, the material is vertically immersed.

2. The outdoor bamboo floor according to claim 1, wherein the oil medium is evenly distributed on each section of the bamboo floor.

3. The outdoor bamboo floor according to claim 1, wherein a moisture content of the bamboo floor is 1-5%, a mildew and discoloration preventing performance harmed value is 0, a width swelling rate of water absorption is 1-4.5%, and a horizontal shear strength is greater than or equal to 12 MPa.

4. The outdoor bamboo floor according to claim 3, wherein the thickness of the bamboo floor is 30-40 mm.

5. The outdoor bamboo floor according to claim 4, wherein the thickness of the bamboo floor is 40 mm.

6. The outdoor bamboo floor of claim 1, wherein the bamboo floor has a thickness swelling rate of water absorption of 9%.

7. The outdoor bamboo floor of claim 1, wherein the bamboo floor has a thickness swelling rate of water absorption of 2.7%.

* * * * *